United States Patent
Maeda et al.

(10) Patent No.: US 8,945,796 B2
(45) Date of Patent: Feb. 3, 2015

(54) CELL FOR FUEL CELL, METHOD FOR PRODUCING THE SAME, AND GAS CHANNEL STRUCTURE FOR FUEL CELL

(75) Inventors: Kuroudo Maeda, Miyoshi (JP); Hideyo Oomori, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 590 days.

(21) Appl. No.: 12/741,286

(22) PCT Filed: Nov. 4, 2008

(86) PCT No.: PCT/JP2008/070017
§ 371 (c)(1),
(2), (4) Date: May 4, 2010

(87) PCT Pub. No.: WO2009/060816
PCT Pub. Date: May 14, 2009

(65) Prior Publication Data
US 2010/0239949 A1 Sep. 23, 2010

(30) Foreign Application Priority Data
Nov. 5, 2007 (JP) .................................. 2007-287352

(51) Int. Cl.
*H01M 8/00* (2006.01)
*H01M 8/04* (2006.01)
*H01M 8/10* (2006.01)
*H01M 8/02* (2006.01)

(52) U.S. Cl.
CPC .......... *H01M 8/0232* (2013.01); *H01M 8/0245* (2013.01); *H01M 8/0247* (2013.01); *H01M 2008/1095* (2013.01); *Y02E 60/50* (2013.01)
USPC ............................ 429/535; 429/514; 429/483

(58) Field of Classification Search
USPC .......................... 429/483, 512, 513, 514, 535
See application file for complete search history.

(56) References Cited

U.S. PATENT DOCUMENTS 3,607,411 A * 9/1971 Brownrigg .................... 429/242
6,383,678 B1 5/2002 Kaneko et al.
(Continued)

FOREIGN PATENT DOCUMENTS

CN 1665058 A 9/2005
EP 1 009 051 A2 6/2000
(Continued)

OTHER PUBLICATIONS

Supplementary European Search Report mailed Dec. 13, 2011.
(Continued)

*Primary Examiner* — Muhammad Siddiquee
(74) *Attorney, Agent, or Firm* — Kenyon & Kenyon LLP

(57) ABSTRACT

A cell for a fuel cell, comprising a membrane electrode assembly, expanded moldings that are laminated to both surfaces of the membrane electrode assembly and form gas channels, and separators that are laminated to the gas channel structures and separate the gases between adjacent cells, wherein each of the expanded moldings comprises a gas channel substrate formed from a metal material such as a titanium material or a stainless steel, a conductive layer that is formed from a conductor such as gold on a contact portion of the gas channel substrate that contacts the membrane electrode assembly or the separator, and a hydrophilic layer that is formed from a hydrophilic material such as a titanium oxide on the gas channel surface of the gas channel substrate.

2 Claims, 7 Drawing Sheets

(56) References Cited

U.S. PATENT DOCUMENTS

| | | | |
|---|---|---|---|
| 2004/0081879 A1* | 4/2004 | Washima et al. | 429/34 |
| 2005/0164071 A1* | 7/2005 | Horiguchi | 429/38 |
| 2006/0105222 A1 | 5/2006 | Abd Elhamid et al. | |
| 2007/0231659 A1* | 10/2007 | Ma et al. | 429/35 |
| 2009/0089989 A1 | 4/2009 | Hashimoto et al. | |

FOREIGN PATENT DOCUMENTS

| | | | |
|---|---|---|---|
| JP | 2000-173631 A | 6/2000 | |
| JP | 2000-243408 A | 9/2000 | |
| JP | 2001-093539 A | 4/2001 | |
| JP | 2003-157868 A | 5/2003 | |
| JP | 2004-079193 A | 3/2004 | |
| JP | 2004-158437 A | 6/2004 | |
| JP | 2004-178893 A | 6/2004 | |
| JP | 2005-209470 A | 8/2005 | |
| JP | 2005-340179 A | 12/2005 | |
| JP | 2007-103075 A | 4/2007 | |
| JP | 2007-134145 A | 5/2007 | |
| JP | 2007-146250 A | 6/2007 | |
| WO | 01/59862 A2 | 8/2001 | |
| WO | 2007091718 A1 | 8/2007 | |
| WO | WO 2008/050215 * | 5/2008 | H01M 8/02 |

OTHER PUBLICATIONS

Office Action issued on Apr. 10, 2012 in Canadian Application No. 2,704,776.

* cited by examiner

34

PARTIAL PLATING

CELL FOR FUEL CELL, METHOD FOR PRODUCING THE SAME, AND GAS CHANNEL STRUCTURE FOR FUEL CELL

This is a 371 national phase application of PCT/JP2008/070017 filed 4 Nov. 2008, claiming priority to Japanese Patent Application No. JP 2007-287352 filed 5 Nov. 2007, the contents of which are incorporated herein by reference.

TECHNICAL FIELD

The present invention relates to a cell for a fuel cell and a method for producing the same, and relates more particularly to a cell for a fuel cell comprising a membrane electrode assembly, gas channel structures that are laminated to both surfaces of the membrane electrode assembly and form gas channels, and separators that are laminated to the gas channel structures and separate the gases between adjacent cells, as well as a method for producing such a cell for a fuel cell.

BACKGROUND ART

Fuel cells have recently been highlighted as cells that exhibit a high level of efficiency and excellent environmental characteristics. In a fuel cell, generally, the oxygen within air, which functions as an oxidant gas, is subjected to an electrochemical reaction with hydrogen, which functions as a fuel gas, thereby generating electrical energy. As a result of the electrochemical reaction between the hydrogen and oxygen, water is generated.

Varieties of fuel cell include phosphoric acid fuel cells, molten carbonate fuel cells, solid electrolyte fuel cells, alkali fuel cells and solid polymer fuel cells. Of these, solid polymer fuel cells, which offer certain advantages such as ambient temperature startup and a rapid startup time, are attracting particular attention. This type of solid polymer fuel cell can be used as the power source for moving objects such as vehicles.

A solid polymer fuel cell is assembled by laminating a plurality of unit cells, a current collector and an end plate and the like. Each unit cell for the fuel cell comprises an electrolyte membrane, catalyst layers, gas diffusion layers and separators.

Patent Document 1 discloses a fuel cell having a structure in which a gas diffusion layer comprising a fibrous material is sandwiched between an electrode and a metal separator, wherein a layer of a corrosion-resistant conductive material such as gold (Au) or the like is formed by vapor deposition, sputtering or plating or the like on the gas diffusion layer side of the structure, without forming a plating layer of a corrosion-resistant conductive material such as gold (Au) or the like on the metal separator side of the structure.

Patent Literature 1: JP 2004-178893 A

DISCLOSURE OF INVENTION

Technical Problems

However, when producing a cell for a fuel cell, as mentioned above, a conductor having a high level of electrical conductivity such as gold (Au) or the like is typically coated onto the surface of the gas diffusion layer or the like, thereby reducing the contact resistance between the gas diffusion layer and the separator. However, when a conductor such as gold (Au) or the like is coated onto the gas diffusion layer, because the gas diffusion layer is generally molded from a porous fibrous material, the gold (Au) or the like tends to penetrate into the interior of the gas diffusion layer, meaning even those regions that do not contact the separator may be coated with the gold (Au) or the like. Because conductors such as gold (Au) are generally very expensive, an increase in the usage amount of gold (Au) or the like may cause an increase in the production costs for the cell for a fuel cell. Furthermore, conductors such as gold (Au) are often hydrophobic, and may therefore impede the discharge of water generated during electric power generation by the fuel cell, resulting in a reduction in the electric power generation efficiency of the fuel cell.

Accordingly, an advantage of the present invention is to provide a cell for a fuel cell that is capable of keeping production costs low and exhibits improved electric power generation efficiency, as well as a method for producing such a cell for a fuel cell.

Solution to the Problems

A cell for a fuel cell according to the present invention comprises a membrane electrode assembly, gas channel structures that are laminated to both surfaces of the membrane electrode assembly and form gas channels, and separators that are laminated to the gas channel structures and separate the gases between adjacent cells, wherein the gas channel structures have a gas channel substrate formed from a metal material, a conductive layer that is formed from a conductor on a contact portion of the gas channel substrate that contacts the membrane electrode assembly or the separator, and a hydrophilic layer that is formed from a hydrophilic material on the gas channel surface of the gas channel substrate.

A method for producing a cell for a fuel cell according to the present invention is a method for producing a cell for a fuel cell that comprises a membrane electrode assembly, gas channel structures that are laminated to both surfaces of the membrane electrode assembly and form gas channels, and separators that are laminated to the gas channel structures and separate the gases between adjacent cells, wherein molding of the gas channel structures comprises a gas channel substrate formation step of forming a gas channel substrate from a metal material, a conductive layer formation step of forming a conductive layer of a conductor on a contact portion of the gas channel substrate that contacts the membrane electrode assembly or the separator, and a hydrophilic layer formation step of forming a hydrophilic layer of a hydrophilic material on the gas channel surface of the gas channel substrate.

A method for producing a cell for a fuel cell according to another aspect of the present invention is a method for producing a cell for a fuel cell that comprises a membrane electrode assembly, gas channel structures that are laminated to both surfaces of the membrane electrode assembly and form gas channels, and separators that are laminated to the gas channel structures and separate the gases between adjacent cells, wherein molding of the gas channel structures comprises a gas channel substrate formation step of forming a gas channel substrate from a metal material, a conductive layer formation step of forming a conductive layer of a conductor on a contact portion of the gas channel substrate that contacts the membrane electrode assembly or the separator, and a hydrophilic layer formation step of forming a hydrophilic layer on the gas channel surface of the gas channel substrate by performing a hydrophilic treatment.

A gas channel structure for a fuel cell according to the present invention is laminated to both surfaces of a membrane electrode assembly and forms gas channels, wherein the gas channel structure has a gas channel substrate formed from a metal material, a conductive layer that is formed from a conductor on a contact portion of the gas channel substrate that contacts the membrane electrode assembly or a separator, and a hydrophilic layer that is formed from a hydrophilic material on the gas channel surface of the gas channel substrate.

Advantageous Effects of the Invention

As described above, in a cell for a fuel cell according to the present invention and in a method for producing such a cell for a fuel cell, by reducing the amount used of the conductor such as gold (Au) or the like, production costs can be kept low, and electric power generation efficiency can be improved.

REFERENCES SIGNS LIST

Figure 1:
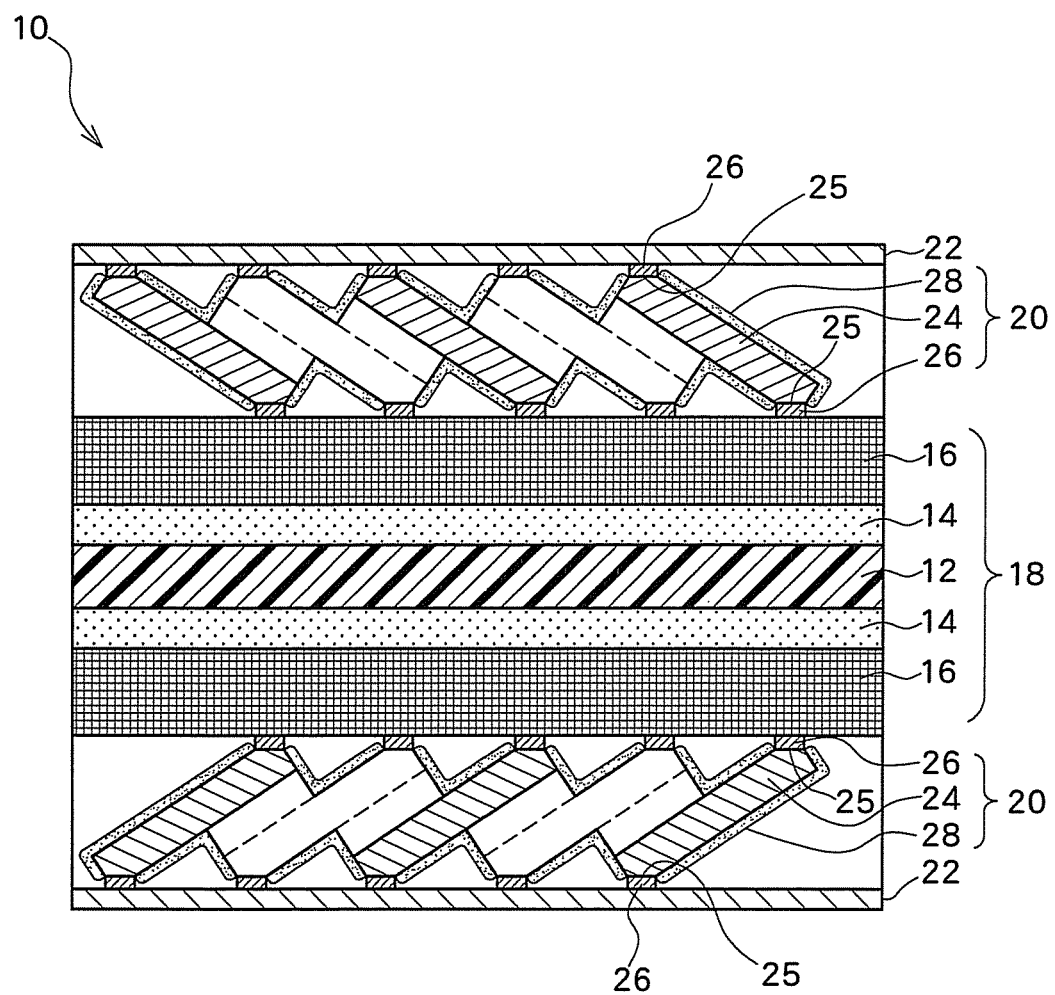
FIG. 1 is a diagram illustrating a cross-section of a cell for a fuel cell according to an embodiment of the present invention.

10 Cell for fuel cell
12 Electrolyte membrane
14 Catalyst layer
16 Gas diffusion layer
18 Membrane electrode assembly
20 Expanded molding
22 Separator
24 Gas channel substrate
25 Contact portion
26 Conductive layer
28 Hydrophilic layer
30 Strand portion
32 Bond portion
34 Porous metal substance
50 Plating apparatus
52 Plating liquid tank
54 First roller
56 Second roller

BEST MODE FOR CARRYING OUT THE INVENTION

A detailed description of embodiments according to the present invention is provided below with reference to the drawings. FIG. 1 is a diagram illustrating a cross-section of a cell 10 for a fuel cell. The cell 10 for a fuel cell comprises a membrane electrode assembly (MEA) 18, which integrates an electrolyte membrane 12, catalyst layers 14 and gas diffusion layers 16, and forms an electrode or the like, as well as expanded moldings 20, which are gas channel structures that form gas channels, and separators 22 that separate the fuel gas or oxidant gas from adjacent cells (not shown in the drawing).

The electrolyte membrane 12 has a function of transporting hydrogen ions generated at the anode electrode side to the cathode electrode side. A chemically stable fluororesin such as a perfluorocarbon sulfonic acid ion exchange membrane or the like may be used as the material for the electrolyte membrane 12.

The catalyst layers 14 have a function of accelerating the oxidation reaction of hydrogen at the anode electrode side and the reduction reaction of oxygen at the cathode electrode side. The catalyst layer 14 comprises a catalyst and a catalyst support. In order to maximize the electrode surface area available for reaction, the catalyst is generally in a particulate form that is adhered to the catalyst support. For the oxidation reaction of hydrogen and the reduction reaction of oxygen, a platinum group element having a small activation overpotential such as platinum or the like may be used as the catalyst. A carbon material such as carbon black or the like may be used as the catalyst support.

The gas diffusion layers 16 have a function of diffusing the fuel gas such as hydrogen gas and the oxidant gas such as air through to the respective catalyst layers 14, and a function of transporting electrons. A material that exhibits conductivity, such as a carbon fiber woven fabric or a carbon paper or the like, may be used for the gas diffusion layers 16.

The expanded moldings 20 are laminated onto both surfaces of the membrane electrode assembly 18, and function as gas channel structures that form gas channels. The expanded molding 20 is laminated so as to contact the gas diffusion layer 16 of the membrane electrode assembly 18 and the separator 22, and is connected electrically to both the membrane electrode assembly 18 and the separator 22. The expanded molding 20 comprises a gas channel substrate 24 that forms gas channels, a conductive layer 26 that is formed on contact portions 25 of the gas channel substrate 24 that contact either the membrane electrode assembly 18 or the separator 22, and a hydrophilic layer 28 that is provided on the gas channel surfaces of the gas channel substrate 24 and is formed from a hydrophilic material.

The gas channel substrate 24 has a mesh structure comprising a multitude of openings. The mesh formed within the gas channel substrate 24 functions as gas channels for the fuel gas or oxidant gas. Because the expanded molding 20 has a multitude of openings, a larger quantity of the fuel gas or the like can contact the membrane electrode assembly 18 and undergo chemical reaction, meaning the electric power generation efficiency of the cell 10 for a fuel cell can be increased.

The gas channel substrate 24 has contact portions 25 that contact either the membrane electrode assembly 18 or the separator 22 along the length of the membrane electrode assembly 18 or the separator 22, thereby electrically connecting the membrane electrode assembly 18 and the separator 22. A plurality of these contact portions 25 may be provided with a predetermined spacing therebetween. The spacing between the contact portions 25 can be set, for example, within a range from 600 to 800 μm.

For the gas channel substrate 24, the use of an expanded metal prescribed in JIS G 3351, or a metal lath or porous metal substance prescribed in JIS A 5505 or the like is preferable. The reason for this preference is that these expanded metals and porous metal substances and the like comprise a multitude of openings. Of course, depending on other conditions, the gas channel substrate 24 is not necessarily restricted to expanded metals and the like, and may also employ some other form of molding such as a punched metal or the like.

The gas channel substrate 24 is preferably formed from a titanium material such as titanium or a titanium alloy, or a stainless steel such as SUS316L or SUS304 or the like. The reason for this preference is that these metal materials have a high mechanical strength, and include an inactive coating such as a passivation film comprising a stable oxide (such as $TiO$, $Ti_2O_3$ or $TiO_2$, $CrO_2$, $CrO$ or $Cr_2O_3$) formed on the metal surface, and therefore exhibit excellent corrosion resistance. For the stainless steel, an austenite stainless steel or ferrite stainless steel or the like may be used.

The conductive layer 26 is formed from a conductor on the contact portions 25 of the gas channel substrate 24 that contact either the membrane electrode assembly 18 or the separator 22, and has the function of reducing the contact resistance between the expanded molding 20 and the membrane electrode assembly 18, and between the expanded molding 20 and the separator 22. The conductive layer 26 is preferably formed from a metal material. The reason for this preference is that metal materials are conductors, and because the gas channel substrate 24 is also formed from a metal material, forming the conductive layer 26 from a metal material yields improved adhesion between the gas channel substrate 24 and the conductive layer 26 compared with the case where the conductive layer 26 is formed from a different material such as a carbon material or the like. Of course, depending on other conditions, an organic conductor or the like may also be used for the conductive layer 26.

The conductive layer 26 is preferably formed from a metal material conductor such as gold (Au), silver (Ag), copper (Cu), platinum (Pt), rhodium (Rh), iridium (Ir) or palladium (Pd) or the like. The reason for this preference is that these metal materials exhibit a high level of electrical conductivity, meaning the contact resistance can be further reduced. Of these metal materials, gold (Au) exhibits superior corrosion resistance and also has excellent electrical conductivity, and is therefore particularly desirable as the metal material for forming the conductive layer 26. The conductive layer 26 may also be formed from an alloy of gold (Au) and platinum (Pt) or the like.

The conductive layer 26 is formed on the contact portions 25 of the gas channel substrate 24 that contact the membrane electrode assembly 18 or the separator 22. In this manner, by forming the conductive layer 26 on the contact portions 25 of the gas channel substrate 24, the amount used of the conductor such as gold (Au) or the like can be reduced. Further, the conductive layer 26 is preferably formed only on the contact portions 25 of the gas channel substrate 24. By forming the conductive layer 26 only on the contact portions 25 of the gas channel substrate 24, the amount used of the conductor such as gold (Au) or the like can be further reduced. The conductive layer 26 is formed with a thickness of not less than 2 nm and not more than 500 nm, and is preferably formed with a thickness of not less than 10 nm and not more than 100 nm.

The hydrophilic layer 28 is formed from a hydrophilic material on the gas channel surfaces of the gas channel substrate 24. By providing the hydrophilic layer 28 on the gas channel surfaces that do not contact the separator 22, the water discharge properties for the generated water can be improved, and the electric power generation efficiency of the cell 10 for a fuel cell can be enhanced. A titanium oxide such as titanium dioxide ($TiO_2$) may be used as the hydrophilic material. The reason for this preference is that titanium oxides exhibit a hydrophilic effect via a photocatalytic action. Of course, depending on other conditions, the hydrophilic material is not necessarily restricted to titanium oxides. The hydrophilic layer 28 is typically formed with a thickness of 0.1 to 1,000 nm, and is preferably formed with a thickness of 2 to 10 nm.

The separators 22 are laminated to the expanded moldings 20, and have the function of separating the fuel gas and oxidant gas in adjacent cells (not shown in the drawings). Furthermore, the separators 22 also have the function of electrically connecting adjacent cells (not shown in the drawings). The separators 22 are preferably molded from a titanium material such as titanium or a titanium alloy, or a stainless steel such as SUS316L or SUS304 or the like. As described above, the reason for this preference is that these metal materials have a high mechanical strength, and include an inactive coating such as a passivation film comprising a stable oxide formed on the metal surface, and therefore exhibit excellent corrosion resistance. For the stainless steel, an austenite stainless steel or ferrite stainless steel or the like may be used. Of course, depending on other conditions, the metal material that is molded to form the separators 22 need not necessarily be restricted to titanium and stainless steel and the like, and other metal materials may also be used. A titanium sheet or stainless steel sheet or the like is typically used for the separators 22.

Next is a description of a method for producing the cell 10 for a fuel cell.

The membrane electrode assembly 18 is molded by laminating the catalyst layers 14 to both surfaces of the electrolyte membrane 12, laminating a gas diffusion layer 16 to each of the catalyst layers 14, and then performing thermocompression bonding with a heat press or the like. Of course, the method of molding the membrane electrode assembly 18 is not restricted to the above molding method.

Next is a description of a method of molding the expanded moldings 20. The method of molding the expanded moldings 20 comprises a gas channel substrate formation step, a pretreatment step, a conductive layer formation step, and a hydrophilic layer formation step.

The gas channel substrate formation step is a step of forming the gas channel substrate 24 from a metal material. The gas channel substrate 24 such as an expanded metal is molded by subjecting a titanium sheet or stainless steel sheet or the like to cutting and expansion processing or the like. The expanded metal may be molded as a single integrated unit, for example, by inserting zigzag-shaped cuts within the titanium sheet or stainless steel sheet or the like, while simultaneously pushing and expanding the cuts to stretch the sheet into a mesh-like structure.

Figure 2A:
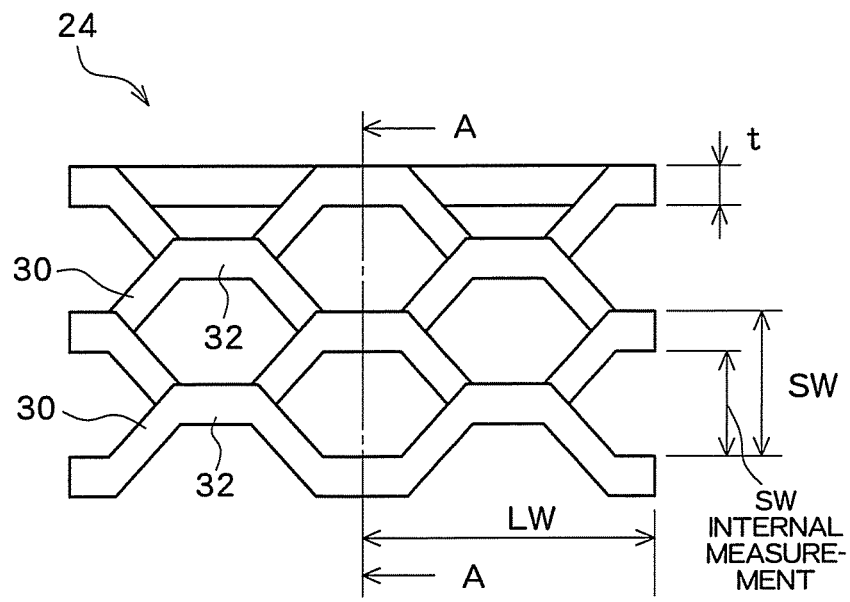
FIG. 2A is a diagram illustrating the structure of a gas channel substrate that uses an expanded metal according to an embodiment of the present invention.
Figure 2B:
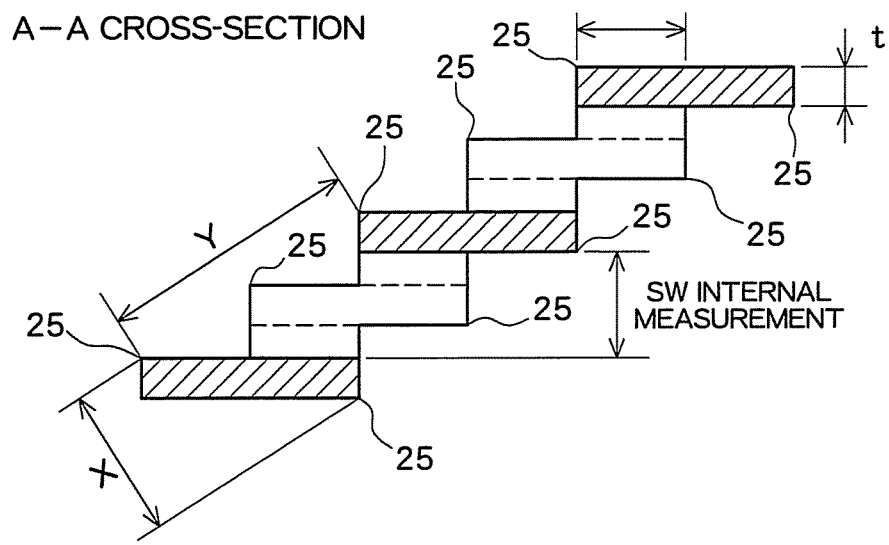
FIG. 2B is a cross-sectional view viewed along the direction A-A in FIG. 2A.
Figure 3:
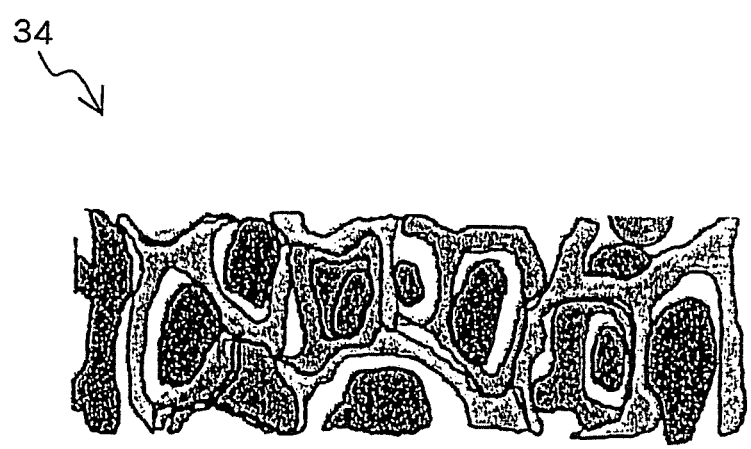
FIG. 3 is a diagram illustrating the structure of a gas channel substrate that uses a porous metal substance according to an embodiment of the present invention.

FIG. 2A and FIG. 2B are diagrams illustrating the structure of a gas channel substrate 24 that employs an expanded metal, wherein FIG. 2A is a schematic illustration of the gas channel substrate 24, and FIG. 2B is a cross-sectional view along the direction A-A. As illustrated in FIG. 2A, the gas channel substrate 24 comprises a plurality of strand portions 30 and a plurality of bond portions 32, and has a mesh structure comprising a multitude of openings. Molding may be performed with the plate thickness (t) of the strand portions 30 within the gas channel substrate 24, the short way midpoint distance (SW) of the mesh, the long way midpoint distance (LW) of the mesh, the short way midpoint distance (SW), and the thickness (X) of the gas channel substrate 24 all set to predetermined values. Furthermore, FIG. 3 is a diagram illustrating the structure of a gas channel substrate 24 that uses a porous metal substance 34. As illustrated in FIG. 3, a plurality of openings are provided within the porous metal substance 34 and form gas channels.

The pretreatment step is a step of pretreating the gas channel substrate 24. The pretreatment of the gas channel substrate 24 includes a cleaning treatment, a neutralization treatment, and an acid washing treatment. First, the gas channel substrate 24 is subjected to a cleaning treatment by alkali dipping degreasing or the like, thereby removing oil components and the like adhered to the surface of the gas channel substrate 24. The cleaned gas channel substrate 24 is then dipped in a neutralizing solution to neutralize the alkali solution. A sulfuric acid solution, hydrochloric acid solution or nitric acid solution or the like may be used as the neutralizing solution. The neutralized gas channel substrate 24 is then subjected to an acid washing treatment, thereby removing the passivation film formed on the surface of the gas channel substrate 24. The acid washing treatment may be conducted by dipping the gas channel substrate 24 in a solution containing a fluoride, such as a nitric hydrofluoric acid solution or a hydrofluoric acid solution or the like.

The conductive layer formation step is a step of forming the conductive layer 26 from a conductor such as gold (Au) or the like on the contact portions 25 of the pretreated gas channel substrate 24. This coating of gold (Au) or the like can be formed, for example, using an electroplating method. A typical gold (Au), silver (Ag) or copper (Cu) electroplating method may be used for the electroplating. For example, in the case where a gold (Au) plating layer is coated onto the contact portions 25 of the gas channel substrate 24 as the conductive layer 26, a gold plating bath comprising gold potassium cyanide or gold sodium sulfite or the like may be used. Further, an alkaline plating bath, a neutral plating bath or an acidic plating bath may be used for the gold plating bath. Furthermore, the particle size of the gold (Au) particles or the like that form the conductive layer 26 may be controlled by altering the current density or the plating treatment time, or by adding additives or the like.

Figure 4:
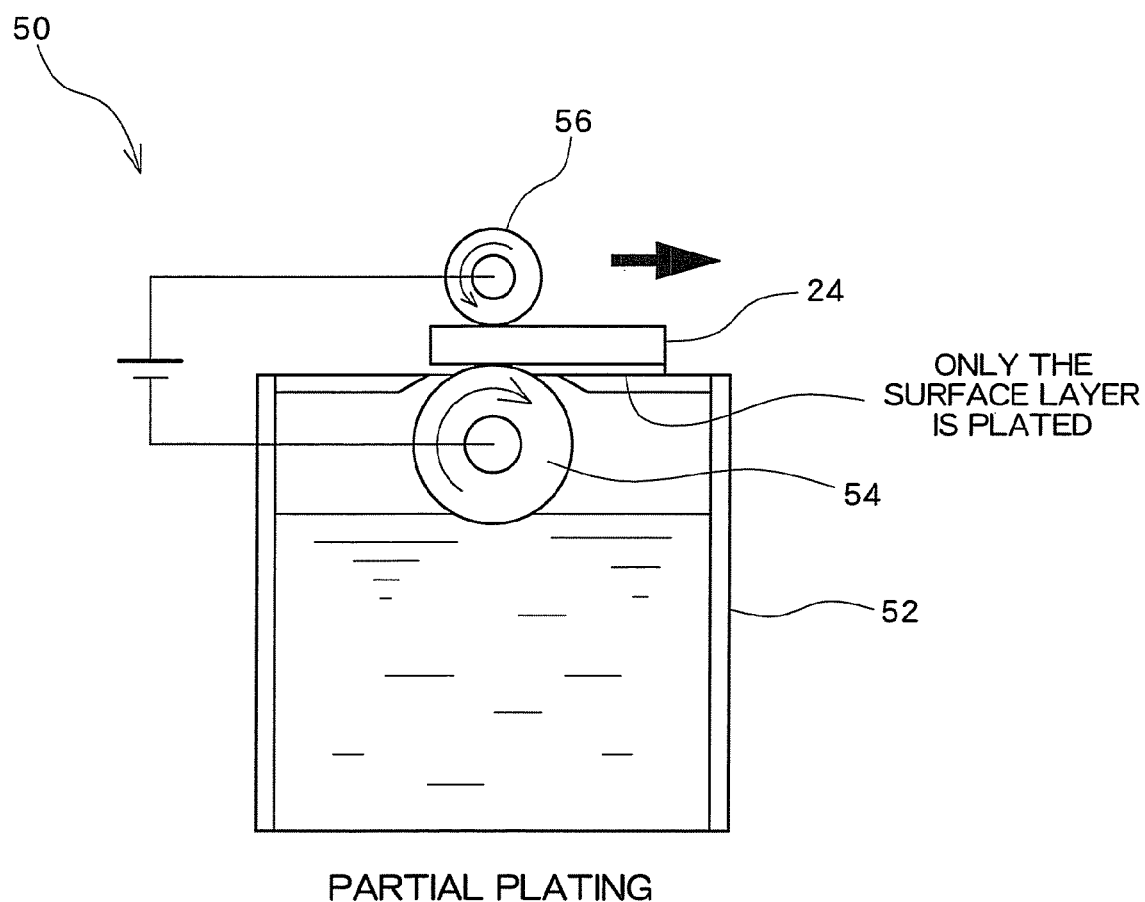
FIG. 4 is a diagram illustrating the structure of a plating apparatus used in an embodiment of the present invention.
Figure 5:
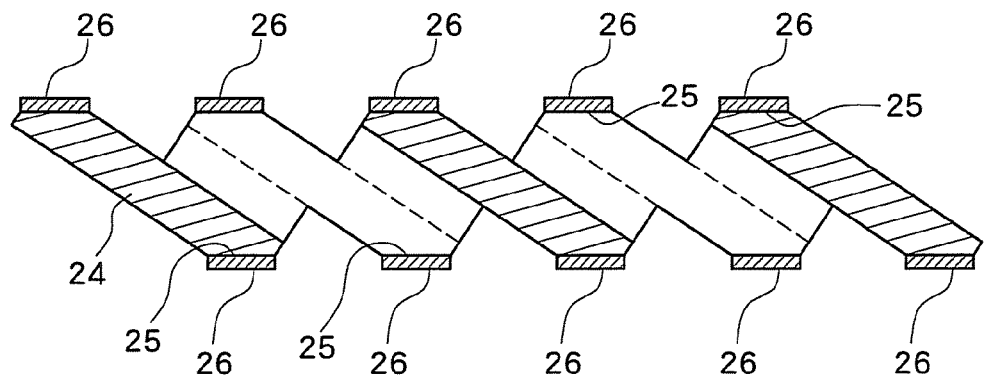
FIG. 5 is a diagram illustrating a gas channel substrate having a conductive layer formed thereon according to an embodiment of the present invention.

FIG. 4 is a diagram illustrating the structure of a plating apparatus 50. The plating apparatus 50 comprises a plating liquid tank 52, a first roller 54 that lifts up the plating liquid, and a second roller 56 that opposes the first roller 54 with the gas channel substrate 24 sandwiched therebetween. The first roller 54 and the second roller 56 are connected to an electrical power source. By adjusting the conditions so that the plating liquid lifted up by the first roller 54 contacts the gas channel substrate 24, a conductor is plated onto the contact portions 25 of the gas channel substrate 24. Following plating of the conductor onto one surface of the gas channel substrate 24 via contact with the first roller 54, the other surface of the gas channel substrate 24 is also plated with the conductor via contact with the first roller 54. As a result, the conductive layer 26 is formed from the conductor on the contact portions 25 of the gas channel substrate 24 that contact the membrane electrode assembly 18 and the separator 22. By using the plating apparatus described above, the conductive layer 26 can be formed on the contact portions 25 without requiring masking or the like of the portions other than the contact portions 25, and therefore production costs can be reduced. FIG. 5 is a diagram illustrating the gas channel substrate 24 having the conductive layer 26 formed thereon. The conductive layer 26 of gold (Au) or the like is formed on the contact portions 25 that contact the membrane electrode assembly 18 and the separator 22.

Of course, the technique used for forming the conductive layer is not restricted to the type of plating method described above, and other coating techniques such as physical vapor deposition methods (PVD methods), chemical vapor deposition methods (CVD methods), coating methods, and inkjet methods may also be used. In a physical vapor deposition method (PVD method), a sputtering or ion plating technique or the like can be used for forming the coating of gold (Au) or the like. In a coating method, a slurry may be prepared by dispersing particles of the gold (Au) or the like in a binder such as an organic solvent, and this slurry containing the dispersed particles of gold (Au) or the like may then be applied to form a coating. Further, in an inkjet method, coating may be performed using a metal ink containing ultra fine particles of gold (Au) or the like dispersed therein.

Figure 6:
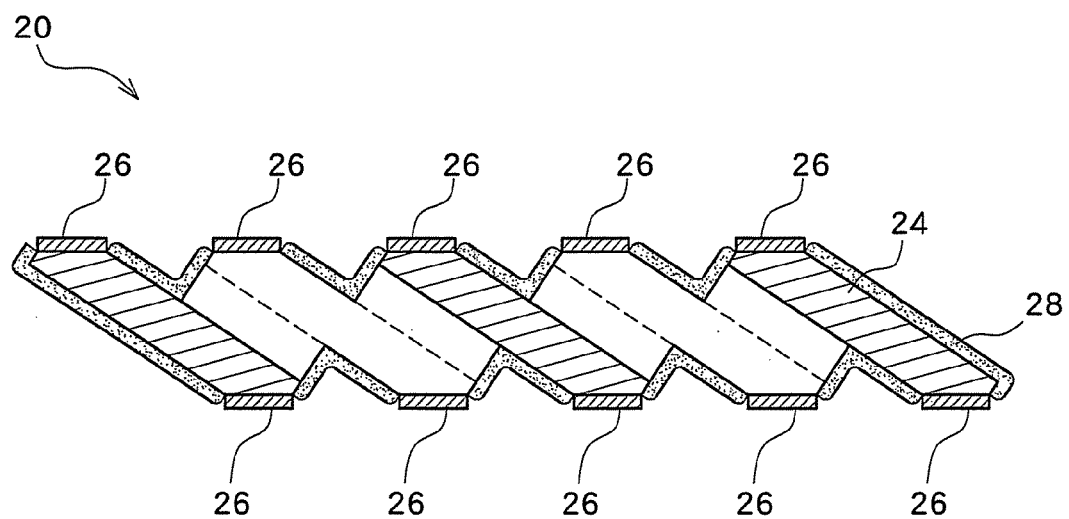
FIG. 6 is a diagram illustrating the structure of an expanded molding according to an embodiment of the present invention.

The hydrophilic layer formation step is a step of forming the hydrophilic layer 28, either from a hydrophilic material or via a hydrophilic treatment, on the gas channel surfaces of the gas channel substrate 24. The hydrophilic layer 28 may be formed, for example, by coating or sputtering a hydrophilic material onto the gas channel surfaces of the gas channel substrate 24. In those cases where the gas channel substrate 24 is formed from a titanium material, the hydrophilic layer 28 is preferably formed from titanium oxide ($TiO_2$), by subjecting the gas channel substrate 24 having the conductive layer 26 formed thereon to a hydrophilic treatment by heating at a temperature of 250 to 800° C. within an oxidizing atmosphere. Because the titanium material remains exposed in those regions where the conductive layer 26 has not been formed, the heat treatment in an oxidizing atmosphere oxidizes the titanium material and forms the titanium oxide. This method enables the hydrophilic layer 28 to be formed with comparative ease, enabling the production costs for the cell 10 for a fuel cell to be kept low. FIG. 6 is a diagram illustrating the structure of the expanded molding 20. The hydrophilic layer 28 is formed on the gas channel surfaces other than the contact portions 25.

Next is a description of a method of molding the separators 22. Molding of the separators 22 can generally be conducted by subjecting a metal material to machining such as cutting work or plastic working such as press working. Of course, the method used for molding the separators 22 is not restricted to the working methods mentioned above.

The assembly step is a step of laminating together the membrane electrode assembly 18, the expanded moldings 20 and the separators 22, thus assembling a preliminary molding of the cell for a fuel cell. The expanded moldings 20 are first laminated to both surfaces of the membrane electrode assembly 18, and the separators 22 are then laminated to the expanded moldings 20 to complete assembly of the preliminary molding of the cell for a fuel cell. The cell 10 for a fuel cell is then produced by bonding the outer peripheral surfaces of this preliminary molding of the cell for a fuel cell with an adhesive or the like.

By adopting the configuration described above, because the conductive layer of gold (Au) or the like is only formed on the contact portions with the membrane electrode assembly and the separator, the amount used of the conductor such as gold (Au) or the like can be reduced, enabling the production costs of the cell for a fuel cell to be kept low.

By adopting the configuration described above, because a hydrophilic layer such as a titanium oxide ($TiO_2$) layer is formed on the gas channel surfaces of the gas channel structure, the water discharge properties for the generated water are improved, meaning the electric power generation efficiency of the cell for a fuel cell can be enhanced.

Examples

Five types of cells for fuel cells were produced, and each cell was evaluated for electric power generation performance and the like.

First is a description of the method used for producing the cells for fuel cells of example 1 and example 2. In the membrane electrode assembly, a fluororesin was used for the electrolyte membrane, platinum supported on carbon black was used for the catalyst layers, and carbon fiber was used for the gas diffusion layers. These items were laminated together, and thermocompression bonding using a hot press was used to complete the membrane electrode assembly. Further, a titanium sheet was used for the separators.

An expanded metal formed from titanium was used as the gas channel substrate 24 of the expanded molding. The expanded metal was subjected to a pretreatment that included cleaning by alkali dipping degreasing, neutralizing using a sulfuric acid solution, and then acid washing in a nitric hydrofluoric acid solution. Subsequently, the contact portions of the pretreated expanded metal were plated by gold (Au) electroplating, thus forming a gold (Au) plating layer as the conductive layer. The plating apparatus illustrated in FIG. 4 was used for forming the gold (Au) plating layer. In the cell for a fuel cell of example 1 the thickness of the gold (Au) plating layer was set to 10 nm, whereas in the cell for a fuel cell of example 2 the thickness of the gold (Au) plating layer was set to 100 nm. The expanded metal having the gold (Au) plating layer formed thereon was then subjected to a heat treatment by being held for 10 minutes in an atmosphere at 300° C., thereby forming a titanium dioxide ($TiO_2$) layer as the hydrophilic layer on the gas channel surfaces other than the contact portions. Finally, the above membrane electrode assembly, the expanded moldings and the separators were laminated together and assembled, completing production of the cells for fuel cells according to example 1 and example 2.

Next is a description of the method used for producing a cell for a fuel cell according to comparative example 1. The membrane electrode assembly and the separators were the same as those used in the cells for fuel cells according to example 1 and example 2. An expanded metal formed from titanium was used as the gas channel substrate of the expanded molding. The expanded metal was subjected to a pretreatment that included cleaning by alkali dipping degreasing, neutralizing using a sulfuric acid solution, and then acid washing in a nitric hydrofluoric acid solution. However, in the cell for a fuel cell according to comparative example 1, a gold (Au) plating layer and a titanium dioxide ($TiO_2$) layer were not formed on the expanded metal. The remaining production was conducted in the same manner as the production method described for the cells for fuel cells of example 1 and example 2.

Next is a description of the method used for producing cells for fuel cells according to comparative example 2 and comparative example 3. The membrane electrode assembly and the separators were the same as those used in the cells for fuel cells according to example 1 and example 2. An expanded metal molded from titanium was used as the gas channel substrate of the expanded molding. The expanded metal was subjected to a pretreatment that included cleaning by alkali dipping degreasing, neutralizing using a sulfuric acid solution, and then acid washing in a nitric hydrofluoric acid solution. Subsequently, the pretreated expanded metal were plated by gold (Au) electroplating, thus forming a gold (Au) plating layer as the conductive layer. The electroplating was conducted using a dipping method in which the pretreated expanded metal was dipped in a gold plating bath. In the cell for a fuel cell of comparative example 2 the thickness of the gold (Au) plating layer was set to 10 nm, whereas in the cell for a fuel cell of comparative example 3 the thickness of the gold (Au) plating layer was set to 100 nm. In the cells for fuel cells according to comparative example 2 and comparative example 3, a titanium dioxide ($TiO_2$) layer was not formed as a hydrophilic layer. Finally, the above membrane electrode assembly, the expanded moldings and the separators were laminated together and assembled, completing production of the cells for fuel cells according to comparative example 2 and comparative example 3.

Figure 7:
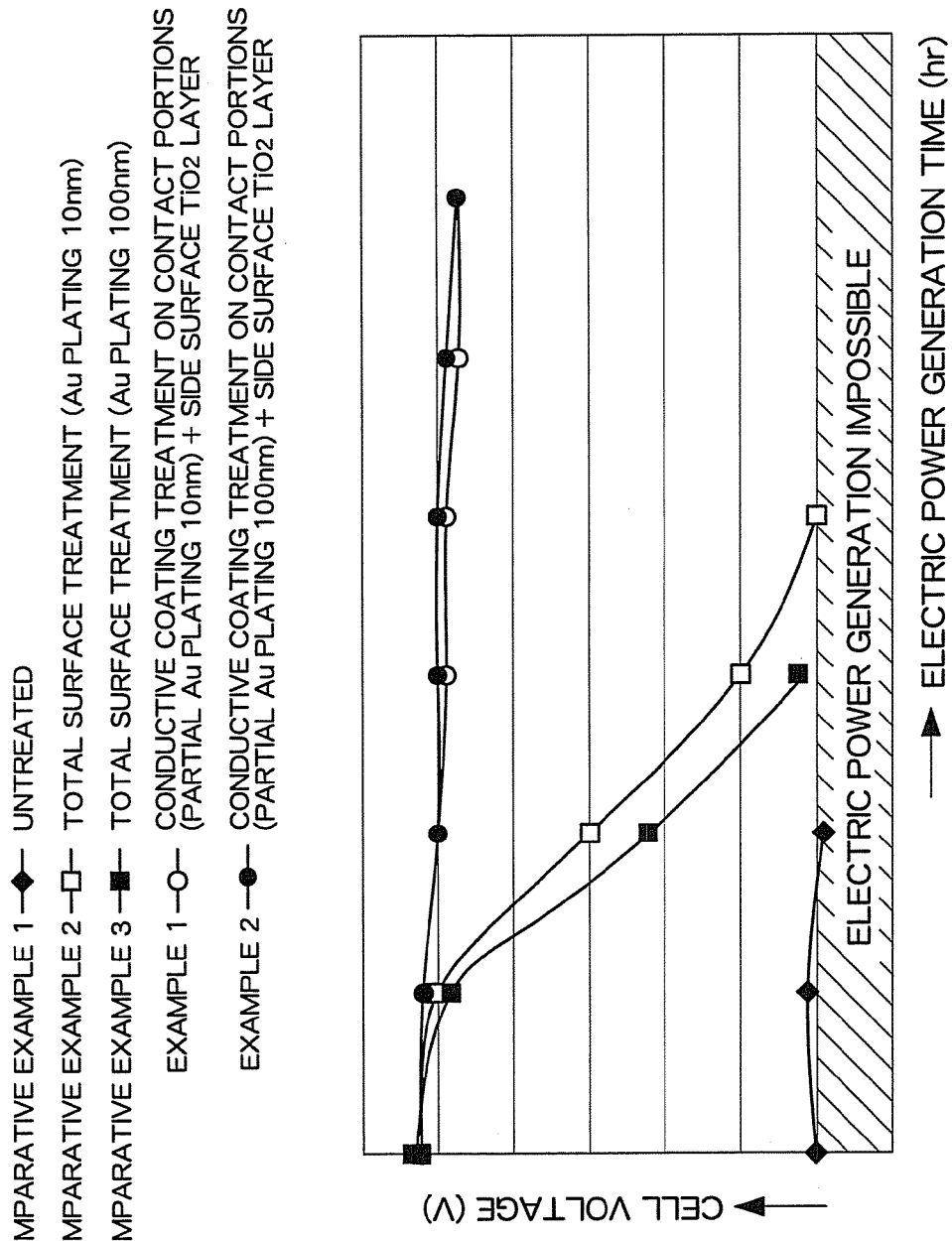
FIG. 7 is a diagram illustrating the test results from evaluating the electric power generation performance in an embodiment of the present invention.

Tests were conducted to evaluate the electric power generation performance of each of the above five types of cells for fuel cells. FIG. 7 is a diagram illustrating the test results from evaluating the electric power generation performance. As illustrated in FIG. 7, the electric power generation time was plotted along the horizontal axis and the cell voltage was plotted along the vertical axis, with the data for the cell for a fuel cell of example 1 shown as white circles, the data for the cell for a fuel cell of example 2 shown as black circles, the data for the cell for a fuel cell of comparative example 1 shown as black diamonds, the data for the cell for a fuel cell of comparative example 2 shown as white squares, and the data for the cell for a fuel cell of comparative example 3 shown as black squares.

In the cell for a fuel cell according to comparative example 1, the cell voltage was low from the start of the test, and yielded a result that represented the lowest electric power generation performance of the five cells for fuel cells. In the cells for fuel cells of comparative example 2 and comparative example 3, the cell voltage decreased after a certain time had elapsed, and the results represented the next lowest electric power generation performance after the cell for a fuel cell according to comparative example 1. In contrast, the cells for fuel cells of example 1 and example 2 suffered almost no reduction in the cell voltage even after a predetermined time had elapsed, and yielded excellent electric power generation performance. This is because in the cells for fuel cells according to example 1 and example 2, the titanium dioxide ($TiO_2$) layer was formed on the gas channel surfaces, thus improving the water discharge properties for the generated water.

Figure 8:
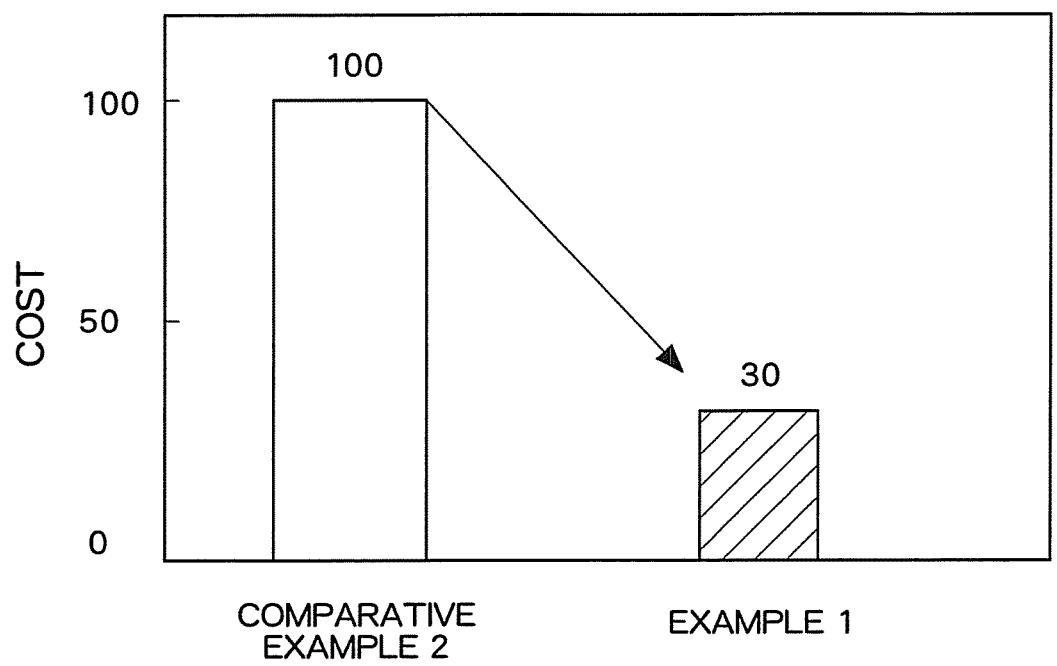
FIG. 8 is a diagram illustrating a comparison of the molding costs for expanded moldings used within cells for fuel cells prepared in an example 1 and a comparative example 2.

Next, a comparison was conducted of the molding costs for the expanded moldings used in the cells for fuel cells according to example 1 and comparative example 2. FIG. 8 is a diagram illustrating the comparison of the molding costs for the expanded moldings used within the cells for fuel cells according to example 1 and comparative example 2. In FIG. 8, the molding cost is illustrated along the vertical axis, and the molding costs of the expanded moldings used in the cells for fuel cells of comparative example 2 and example 1 are illustrated in the form of a bar graph. The molding costs of the expanded moldings were displayed by specifying the molding cost of the expanded molding used in the cell for a fuel cell according to comparative example 2 as a value of 100, and then determining the molding cost of the expanded molding used in the cell for a fuel cell according to example 1 as a relative value. The result revealed a molding cost for the expanded molding used in the cell for a fuel cell according to example 1 of 30, which represents a significantly reduced molding cost compared with that of the expanded molding used in the cell for a fuel cell according to comparative example 2.

In the expanded molding used in the cell for a fuel cell of comparative example 2, the gold plating was conducted by dipping the expanded metal in a gold plating solution. As a result, the gold plating layer was formed not only on the contact portions with the membrane electrode assembly and the separator, but also on the gas channel surfaces. In contrast, in the expanded molding used in the cell for a fuel cell of example 1, the gold plating layer was formed only on the contact portions, and no gold plating layer was formed on the gas channel surfaces. Accordingly, in the expanded molding used in the cell for a fuel cell of example 1, the amount used of the plating solution or the like containing a gold (Au) compound or the like was able to be reduced, resulting in a reduction in the production costs.

The present invention has been described in detail above, but the scope of the present invention is not restricted by the above description.

Further, the detailed description, claims, drawings and abstract of the inventions disclosed in Japanese Patent Application No. 2007-287352, filed on Nov. 5, 2007, are deemed to be incorporated in their entirety within the present application.

INDUSTRIAL APPLICABILITY

A fuel cell of the present invention is effective in any application that utilizes a fuel cell, and is ideal as a fuel cell for mounting in a motor vehicle.

The invention claimed is:

1. A method for producing a cell for a fuel cell that comprises
 a membrane electrode assembly,
 gas channel structures that are laminated to both surfaces of the membrane electrode assembly and form gas channels, and
 separators that are laminated to the gas channel structures and separate gases between adjacent cells, wherein
 molding of the gas channel structures comprises
 a gas channel substrate formation step of forming a gas channel substrate composed of an expanded molding formed from a metal material,
 a conductive layer formation step of forming a conductive layer of a conductor selected from the group consisting of metal materials of gold, silver, copper, platinum, rhodium, iridium and palladium on a contact portion of the gas channel substrate that contacts the membrane electrode assembly or the separator, and
 a hydrophilic layer formation step of forming a hydrophilic layer of a hydrophilic material on a gas channel surface of the gas channel substrate other than the contact portion, wherein
 the conductive layer formation step comprises bringing a surface of the gas channel substrate into contact with a roller that lifts up the plating liquid, to perform partial plating to form a conductor only on the contact portion of a surface layer of the gas channel substrate,
 the hydrophilic layer formation step comprises subjecting the gas channel substrate on which the conductive layer is formed, to a heat treatment in an oxidizing atmosphere to form a metal oxide on the gas channel surface other than the contact portion on which the conductive layer is formed,
 the expanded molding is formed from titanium,
 the plating is cold plating, and
 the metal oxide is titanium oxide.

2. The method for producing a cell for a fuel cell according to claim 1, wherein
 the gas channel substrate formed in the gas channel substrate formation step has an inclined step-like mesh structure comprising a multitude of openings formed by cutting a titanium sheet to arrange short straight-line cuts in a staggered manner, and pushing and expanding the titanium sheet having the cuts formed therein so as to widen the cuts, the gas channel substrate having inclined strand portions and inclined bond portions formed therein, and wherein the method further comprises
 a step of aligning a direction of inclination of the inclined step-like mesh structure of the gas channel substrate and the separator in a parallel arrangement.

* * * * *